United States Patent [19]

Imai et al.

[11] Patent Number: 4,708,185

[45] Date of Patent: Nov. 24, 1987

[54] PNEUMATIC RADIAL TIRE

[75] Inventors: Isamu Imai, Tokorozawa; Kazuo Oshima, Tokyo; Kenichi Tanaka; Norio Inada, both of Fuchu, all of Japan

[73] Assignee: Bridgestone Tire Company Limited, Tokyo, Japan

[21] Appl. No.: 917,285

[22] Filed: Oct. 9, 1986

Related U.S. Application Data

[63] Continuation of Ser. No. 594,631, Mar. 29, 1984, abandoned.

[30] Foreign Application Priority Data

Mar. 30, 1983 [JP] Japan ................... 58-52556

[51] Int. Cl.$^4$ .......................... B60C 3/00; B60C 9/02
[52] U.S. Cl. ..................... 152/451; 152/454; 152/548; 152/556
[58] Field of Search ............ 152/451, 454, 457, 548, 152/556; 57/902; 264/210.5, 235, 289.3

[56] References Cited

U.S. PATENT DOCUMENTS

| | | | |
|---|---|---|---|
| 3,665,994 | 5/1972 | Kovac et al. | 152/359 |
| 3,854,515 | 12/1974 | Takemura et al. | 152/556 X |
| 3,929,180 | 12/1975 | Kawase et al. | 152/359 |
| 4,250,939 | 2/1981 | Shibata et al. | 152/541 |
| 4,513,802 | 4/1985 | Togashi et al. | 152/352 R |

FOREIGN PATENT DOCUMENTS

| | | |
|---|---|---|
| 3126571 | 6/1982 | Fed. Rep. of Germany . |
| 0144106 | 9/1982 | Japan ................... 152/359 R |
| 0191103 | 11/1982 | Japan ................... 152/359 R |
| 0201703 | 12/1982 | Japan ................... 152/359 R |
| 0076307 | 5/1983 | Japan ................... 152/359 R |

*Primary Examiner*—Donald E. Czaja
*Assistant Examiner*—Ramon R. Hoch
*Attorney, Agent, or Firm*—Sughrue, Mion, Zinn, Macpeak, and Seas

[57] ABSTRACT

A pneumatic radial tire is disclosed, which comprises a toroidal tire body extending from bead portions to a crown portion through sidewall portions, and a reinforcement for the tire body consisting of a carcass composed of at least one cord ply containing polyester fiber cords therein, which cord ply being wound around a bead core embedded in each of the bead portions from the inside of the tire to the outside thereof, and a belt composed of at least two ply layers superimposed around the crown portion of the carcass and containing cords arranged at a relatively small inclination angle with respect to the mid-circumferential plane of the tire, the cords of which being crossed with each other. In this type of the tire, the carcass line of the tire body at a mounted state of the tire on a normal rim under a normal internal pressure depicts such a radial profile in tire section that a ratio of R/R' is within a range of 0.65–0.85 in which R' is a radius of a reference arc $\widehat{BEC}$, and R is a radius of curvature of a contour curve FC in a shoulder portion of the carcass line, and that a maximum distance f between the reference arc and a contour curve in a base portion of the carcass line is within a range of 5–10 mm; and the polyester fiber cord has an elongation $\Delta E$ under a tension of 2 g/d of not less than 5%, and a value of $\Delta S + 0.4\Delta E$ of not more than 5.0% in which $\Delta S$ is a heat shrinkage of the cord.

3 Claims, 3 Drawing Figures

PNEUMATIC RADIAL TIRE

This is a Continuation of Ser. No. 594,631, filed on Mar. 29, 1984.

BACKGROUND OF THE INVENTION (1) Field of the Invention

This invention relates to a pneumatic radial tire, and more particularly to a pneumatic radial tire for passenger cars, small-size trucks and the like.

In particular, the invention aims to improve the rolling resistance, while being balanced with performance generally required in the tire of this type such as cornering stability, riding comfort against vibrations, wet skid resistance and the like, by combining the rationalization of radial profile of carcass with the optimization of properties of carcass cord, and principally belongs to the technical field relating to the internal reinforcement of the pneumatic tire.

(2) Description of the Prior Art

In order to reduce the rolling resistance of the tire, there have recently been proposed various countermeasures. Among them, there are primarily two countermeasures on the rubber material of the tread portion most remarkably contributing to the rolling resistance, one of which is the division of the tread rubber into two rubber portions in accordance with performances required for each portion, and the other of which is the reduction of abrasion loss of rubber at a ground contact area. However, such countermeasures can improve the rolling resistance up to a certain level, but if it is intended to attain improvement over the above level, they are obliged to sacrifice basic performances to be naturally required in the pneumatic tire, such as wet skid resistance, abrasion resistance and the like.

On the other hand, as the countermeasure from the viewpoint of the internal structure of the tire, it has been generally attempted to form the carcass line of the tire into an elliptical shape by reducing the aspect ratio of the tire, which is mainly intended to restrain the rolling resistance by reducing the shearing strain accompanied by the stepping-in and kicking-out actions at that region of the sidewall which contacts with the ground. In this case, the smaller the aspect ratio, the larger the shock produced in riding over undulations such as the road joints and the like during the running. Further, in order to equate the rolling radius of this low section tire to that of the standard size tire, it is necessary to adopt a rim with a size larger by one or two times than that of the usually used rim, which results in the increase of vehicle weight and occasionally offsets the effect of reducing the fuel consumption of the vehicle based on the reduction of the rolling resistance.

SUMMARY OF THE INVENTION

It is, therefore, an object of the invention to eliminate the aforementioned drawbacks of the prior art and to advantageously reduce and improve the rolling resistance of the tire for use particularly, in passenger cars, small-size trucks and the like.

As regards the internal reinforcement of such a tire, the invention is based on the invention disclosed in Japanese Patent Application No. 57-187,821 having as a main point such a radial profile of the carcass that the reduction of shearing strain in the stepping-in and kicking-out actions at ground contacting portion of the sidewall can be achieved particularly under an effective control of the bending deformation at that portion of the sidewall which is located near the bead portion, that is, the combination of a contour curve of a large curvature shoulder portion in the carcass line with a contour curve of a small curvature base portion in the carcass line and is originated from a novel knowledge elucidated on advantageous adaptation of polyester fibers as a ply cord for the carcass.

According to the invention, there is the provision of in a pneumatic radial tire comprising a toroidal tire body extending from bead portions to a crown portion through sidewall portions, and a reinforcement for the tire body consisting of a carcass composed of at least one cord ply containing polyester fiber cords therein, which cord ply being wound around a bead core embedded in each of the bead portions from the inside of the tire to the outside thereof, and a belt composed of at least two ply layers superimposed around the crown portion of the carcass and containing cords arranged at a relatively small inclination angle with respect to the mid-circumferential plane of the tire, the cords of which being crossed with each other, the improvement wherein:

a carcass line of said tire body at a mounted state of the tire on a normal rim under a normal internal pressure depicts such a radial profile in tire section that a ratio of R/R' is within a range of 0.65-0.85 in which R' is a radius of a reference arc which passes an intersection B between the carcass line and a straight line passing through an alienating point of the outer surface of the bead portion from a flange of the rim and being in parallel with the rotational axis of the tire, an intersection C between the carcass line and a line segment being perpendicular to the above straight line and extending from the intersection B, and a point located from the line segment $\overline{BC}$ at an interval equal to a distance extending from the line segment $\overline{BC}$ to the maximum width of the carcass line when the line segment $\overline{BC}$ is taken as a chord, and R is a radius of curvature of a contour curve in a shoulder portion of the carcass line extending to the intersection C, and that a maximum distance f between the reference arc and a contour curve in a base portion of the carcass line smoothly connecting to the above contour curve and having a single inflection point toward the intersection B is within a range of 5–10 mm; and said polyester fiber cord has an elongation $\Delta E$ under a tension of 2 g/d of not less than 5%, and a value of $\Delta S + 0.4 \Delta E$ of not more than 5.0% in which $\Delta S$ is a heat shrinkage of the cord.

According to a preferred embodiment of the invention, the polyester fiber cord is composed of a bundle of plural fibers having a twist constant NT of 0.4–0.6 defined by the following equation (1):

$$NT = N \times \sqrt{0.139 \times D/2\rho} \times 10^{-3} \tag{1}$$

in which N is a twisting number per 10 cm of cord length, D is a total denier of cord and $\rho$ is a specific gravity of the fiber. In another preferred embodiment of the invention, the polyester fiber cord has such micro properties as a fiber that an intrinsic viscosity is 0.75–1.10, specific gravity is 1.356–1.390, a birefringence $\Delta N$ is $155 \times 10^{-3} \sim 195 \times 10^{-3}$ and number of terminal carboxyl groups is not more than 20 equivalents/ton.

BRIEF DESCRIPTION OF THE DRAWINGS

The invention will be described in greater detail with reference to the accompanying drawings, wherein.

DETAILED DESCRIPTION OF THE INVENTION

Figure 1:
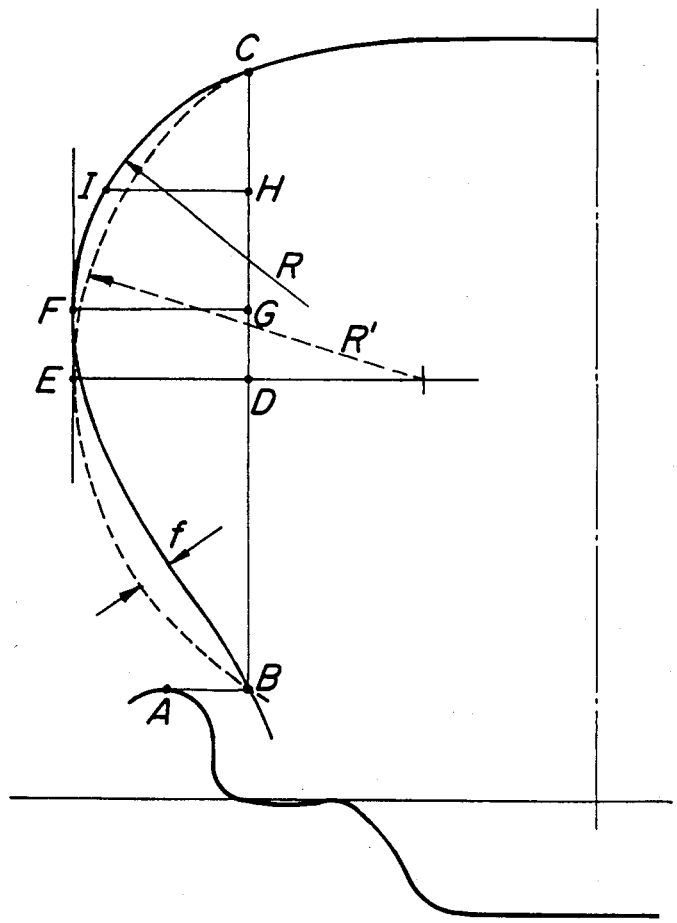
FIG. 1 is a schematic view illustrating the relation between the carcass radial profile (solid line) and the reference arc (broken line) in the radial tire according to the invention.

When the conventionally used organic fiber cords each made from nylon 6 fiber, nylon 66 fiber, ordinary polyester (PET) fiber or the like are used as a ply cord for the carcass, even if the carcass line is designed to meet the above carcass radial profile, the ply cords are released from tension in the removal of the finished tire from the mold immediately after vulcanization to cause the contraction of the tire, so that it is actually difficult to obtain a desired carcass line in the sidewall portion of the tire. Further, when the resulting tire is subjected to a post-cure inflation, the final tire profile is very different from the shape given during molding.

Upon having repeatedly made various investigations and experiments with respect to the polyester fiber cord, the inventors have found that the intended tire performance can be first obtained by adjusting the elongation $\Delta E$ under a tension of 2 g/d to not less than 5% and the sum of $\Delta S$ and 0.4 $\Delta E$ ($\Delta S$ is a heat shrinkage) to not more than 5.0% in the polyester fiber.

As the polyester fiber cord, there is advantageously adopted one obtained by twisting plural polyester fibers in such a manner that the twist constant represented by the equation (1) is within a range of 0.4–0.6, applying an RFL solution (a mixed aqueous solution of resorcin, formaldehyde and latex) usually used as an adhesive to the resulting cord, and then subjecting the thus coated cord to a heat treatment at a temperature of from 230° C. to the melting point. It is preferable that the polyester fiber has the micro properties of an intrinsic viscosity of 0.75–1.10, a specific gravity $\rho$ of 1.356–1.390, a birefringence $\Delta N$ of $165 \times 10^{-3} \sim 195 \times 10^{-3}$ and number of terminal carboxyl groups of not more than 20 equivalents/ton.

Although the use of steel wire cords, Kevlar cords or the like may be considered to suppress the above contraction, since the modulus of elasticity of these cords is too high, there is caused a fear of degrading the riding comfort. On the other hand, when rayon cords widely used as a general purpose cord are applied to the invention, the reduction of strength is conspicuous at a region of the carcass corresponding to the contour curve of shoulder portion and also resistance to shock from the road surface is weak.

According to the invention, the reason why the ratio R/R' in the contour curve of shoulder portion is limited to a range of 0.65–0.85 is due to the fact that when the ratio is less than 0.65, the bending rigidity of the carcass at the shoulder portion extremely lowers and deformation concentrates in a relatively thicker region of the shoulder portion to contribute to no reduction of the rolling resistance. When the ratio exceeds 0.85, the bending rigidity becomes too high due to the increase of tension applied to the carcass, so that it not only leads to no reduction of the rolling resistance but also deteriorates the riding comfort.

With respect to the contour curve of the base portion in the carcass line, if the maximum distance f from the reference arc is less than 5 mm, no necessary rigidity can be obtained at the bead portions so that a sufficient stability during cornering can not be assured. On the other hand, when the value f exceeds 10 mm, it is generally difficult to set the ratio R/R' in a range of 0.65–0.85, and the riding comfort is deteriorated. Therefore, it is necessary to set the value f within a range of 5–10 mm.

According to the invention, the polyester fiber cord is generally preferred to have a small heat shrinkage and a loss modulus of elasticity. Specifically, it is necessary that in the polyester fiber cord, the elongation $\Delta E$ under a tension of 2 g/d is not less than 5% and the sum of 0.4 $\Delta E$ and the heat shrinkage $\Delta S$ is not more than 5%. The term "heat shrinkage $\Delta S$" used herein is defined by a shrinkage of a sample cord having a length of 50 cm after it is left at 177° C. under a load of 50 g for 30 minutes. When the elongation $\Delta E$ is not less than 5% and if the value of $\Delta S + 0.4 \Delta E$ exceeds 5.0%, $\Delta S$ becomes more than 3%, and in this case it is difficult to obtain the intended carcass radial profile. Further, when $\Delta E$ is less than 5%, the riding comfort is disadvantageously deteriorated.

The reason why the twist constant NT of the polyester fiber cord represented by the equation (1) is limited to a range of 0.4–0.6 is due to the fact that when the twist constant NT is less than 0.4, the resistance to flexural fatigue is extremely poor, while when NT exceeds 0.6, it is impossible to obtain necessary strength and heat shrinkage and particularly it is impossible to maintain the value of $\Delta S + 0.4 \Delta E$ in a range of not more than 5%.

With the intrinsic viscosity being not more than 1.10, the polyester fiber for the above cord is advantageous in the heat shrinkage, while when the intrinsic viscosity becomes less than 0.75, sufficient strength and fatigue resistance cannot be obtained. Thus, such fibers are not suited for the ply cord of the carcass. On the other hand, when the intrinsic viscosity exceeds 1.10, it is difficult to meet the above requirement of $\Delta S + 0.4 \Delta E \leq 5\%$ as cord property after the heat treatment following the dipping treatment in the RFL solution (a mixed aqueous solution of resorcin, formaldehyde and latex) usually used as an adhesive. Further, when the birefringence $\Delta N$ is less than $165 \times 10^{-3}$, the heat deterioration resistance and strength after the dipping treatment are insufficient, while when it exceeds $195 \times 10^{-3}$, it is impossible to obtain fully stable crystalline and amorphous states of the cord. Further, when the number of terminal carboxyl groups exceeds 20 equivalents/ton, the resulting cords are insuitable as tire cords due to the degradation in the heat deterioration resistance of the cords in the rubber.

With respect to the tire manufactured by mold vulcanization after the general tire forming process using the polyester fiber cords with the above specified properties as a ply cord for the carcass and specifying the carcass radial profile as mentioned above, it is preferable that the tire is subjected to a post-cure inflation at an internal pressure of not more than 1.5 kg/cm² immediately after the vulcanization.

The carcass radial profile according to the invention is a profile intentionally deviated from the natural equilibrium form and is applicable to tires with any aspect ratios. Particularly, this profile has been led from results of the following investigation on the deformation state of the sidewall portion produced when the radial carcass tire was run under a load.

In general, the deformation of the sidewall portion is classified into a bending deformation and a shearing deformation. In this connection, the inventors have made further detailed investigations and noted such a difference in deformation type that the bending deformation predominantly contributes to a lower region (or a region near the bead portion) of the sidewall portion, while the shearing deformation predominantly contributes to an upper region (or a region near the tread portion) of the sidewall portion.

Firstly, when the tire is run under a load, the shearing deformation in the upper region of the sidewall portion is small at a position just beneath the loading, but remarkably increases in the vicinity of stepping-in or kicking-out portion against ground, so that it contributes considerably to energy consumption as a whole.

Secondly, since the shearing deformation and the bending deformation are inversely proportional the shearing deformation is decreased with the increase in the bending deformation.

Since the upper region of the sidewall portion generally has a relatively small thickness, the energy consumption can totally be reduced by decreasing the shearing deformation which is so largely contributable to the energy consumption, even when the bending deformation concentratedly produced near the position just beneath the loading is slightly increased.

In order to increase the bending deformation in the upper region of the sidewall portion, it is necessary to increase the curvature in the contour curve of the shoulder portion of the carcass corresponding to the upper region of the sidewall portion when the tire is mounted on a normal rim under a normal internal pressure. As a result of various investigations with respect to the radius of curvature R of this contour curve, the ratio R/R' in which R' is the radius of the reference arc as shown in FIG. 1 is adapted to the above defined range.

In this case, it should be noted that although the arc $\widehat{BEC}$ as shown in FIG. 1 is merely a reference arc and is essentially different from the carcass radial profile based on the natural equilibrium form, since the upper region of the sidewall portion is relatively thin in the thickness and low in the rigidity in itself, the carcass radial profile based on the natural equilibrium form extremely approximates to a part EC of the arc.

That is, it should be noted that the value of 0.65–0.85 with respect to the ratio R/R' can not be attained unless the natural equilibrium form is intentionally changed.

If the ratio R/R' is larger than 0.85, it is impossible to satisfactorily obtain the effect of improving the rolling resistance by decreasing the shearing deformation in the upper region of the sidewall portion through intentionally deviating from the natural equilibrium form as described in the following example. On the other hand, if the ratio R/R' is less than 0.65, the bending deformation concentrates in a buttress portion with a relatively large thickness, which offsets the effect of improving the rolling resistance by the decrease of the shearing deformation as previously mentioned.

Next, the energy consumption due to the bending deformation in the lower region of the sidewall portion can generally be expressed by the following equation:

$$\text{Energy consumption} = A \cdot E \cdot \tan \delta \cdot (\Delta C)^2 \cdot S \qquad (2)$$

in which A is a certain constant, E is an elasticity coefficient of the lower region of the sidewall portion, $\Delta C$ is a change of the curvature in the lower region of the sidewall portion due to the bending deformation, and S is a length of the lower region of the sidewall portion as measured from a point corresponding to the maximum width of the carcass.

Figure 2:
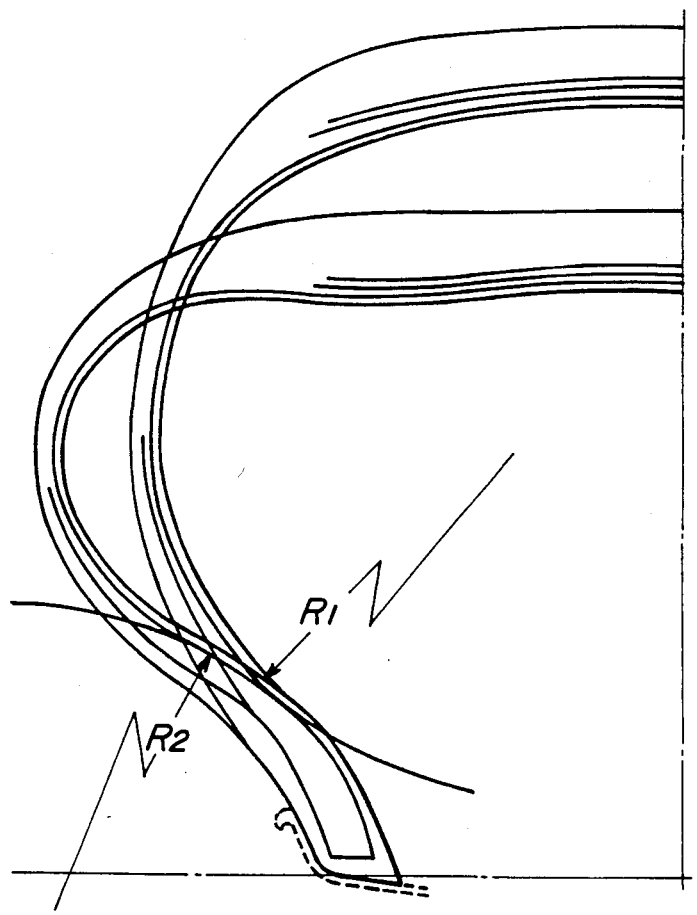
FIG. 2 is a schematic view illustrating the deformation behavior of the tire when a normal load is applied to the tire.

Therefore, it is apparent that if E, tan $\delta$ and S are kept substantially constant, the energy consumption is proportional to $(\Delta C)^2$. Now, the change of the curvature in the lower region of the sidewall portion was measured when a load is actually applied to the tire, whereby there were obtained the following results:

That is, as shown in FIG. 2, when a normal load is applied to the tire, the lower region of the sidewall portion is deformed into a profile of inverted R. In other words, the outwardly convex profile having the radius of curvature $R_1$ before the deformation is changed to the outwardly concave profile having the radius of curvature $R_2$ after deformation under loading. Moreover, the change of curvature $(\Delta C)^2$ in the lower region of the sidewall portion according to the equation (2) can be expressed by the following equation:

$$(\Delta C)^2 = \left( \frac{1}{R_1} + \frac{1}{R_2} \right)^2 \qquad (3)$$

When the tire is mounted on a normal rim under a normal internal pressure, if the lower region of the sidewall portion has already the inverted R profile, the change of curvature $(\Delta C')^2$ is:

$$(\Delta C')^2 = \left( \frac{1}{R_1} - \frac{1}{R_2} \right)^2 \qquad (4)$$

which is clearly smaller than $(\Delta C)^2$ of the equation (3), so that the energy consumption in accordance with the equation (2) can be reduced.

From this point, it is effective to give the inverted R profile to the lower region of the sidewall portion when the tire is inflated at the normal internal pressure. Particularly, it is most preferable to invert the curvature of the carcass itself taking into consideration the fact that the bending deformation is produced mainly at the carcass bearing the charged internal pressure.

The inventors have made various studies with respect to the degree of inverting the curvature of the carcass. As a result, it has been found that such a degree can be represented by the maximum distance f between the carcass line FB and the arc $\widehat{BE}$ as shown in FIG. 1 and the appropriate range of f is 5–10 mm as defined above.

As previously mentioned, the arc $\widehat{BEC}$ is merely the reference arc and is different from the carcass radial profile based on the natural equilibrium form. Particularly, since the carcass is turned up around the bead core in the radially outward direction and a rubber filler is filled between the carcass and the turnup portion thereof to reinforce the bead portion, the lower region of the sidewall portion becomes a portion having a relatively high rigidity, so that the carcass radial profile based on the natural equilibrium form is generally present inside the arc $\widehat{BE}$ shown in FIG. 1.

However, the value f of 5-10 mm in the invention can be attained only by intentionally deviating the carcass line from the natural equilibrium form and inverting the curvature of the carcass in the lower region of the sidewall portion, which is utterly discernible from the conventional natural equilibrium form. If the value f is less than 5 mm, the effect of reducing the energy consumption in accordance with the principle expressed by the equations (2)-(4) can not satisfactorily be developed, while if the value f exceeds 10 mm, not only the tension of the carcass in the lower region of the sidewall portion under the charged internal pressure becomes too high to adversely affect the durability, but also the carcass is positioned in the inside of the tire and hence the outer surface of the tire is located relatively inside of the tire so as to deteriorate the fitness between the tire and the rim.

In this way, the deformation under the charged internal pressure becomes larger at the lower region of the sidewall portion beneath the position corresponding to the maximum width of the carcass, which has an influence on the tension distribution of the carcass. As a result, the tension of the carcass is high in the vicinity of the bead portion having a larger outward deformation to exhibit a larger apparent rigidity, while the outward deformation is small in an area extending from the upper region of the sidewall portion to the buttress portion so that the tension of the carcass in this area is relatively small to exhibit a lower apparent rigidity. This fact serves to improve the rolling resistance, while being balanced with the cornering stability, riding comfort against vibrations and wet skid resistance, as mentioned later.

At first, when a slip angle is given to the tire, a lateral force acts upon the tire to cause the lateral deformation of the tire. In the tire according to the invention, however, since the tension of the carcass in the vicinity of the bead portion is high and the apparent rigidity is large, the rigidity against the lateral deformation becomes larger, so that the high cornering power, and particularly good cornering stability at a large slip angle are developed.

Such an improving effect is most clearly observed in the case of the dry road surface and is developed even in the case of the wet road surface. For instance, such an effect can be clearly grasped as a difference in the running time required for the same locus slalom running on the wet road at the same distance.

Next, explanation will be given on the riding comfort against vibrations when the tire rides over the protuberances scattered on the road surface. In the ordinary radial tire, since a belt composed of plural belt layers each containing cords with a high modulus of elasticity inclined at a very shallow angle with respect to the equatorial plane of the tire is superimposed around the crown portion of the carcass, the bending rigidity in the thickness direction of the thread portion is extremely high. Therefore, when the tire rides over protuberances during the running on the road, the tread portion is hardly fully deformed, so that all the shock produced at the tread portion can not be absorbed by the sidewall portion and a part thereof is transmitted to the wheel shaft through the bead portion and the rim wheel to thereby cause shock vibrations. The improvement of the riding comfort against such shock vibrations is mainly concerned with how to absorb and damp the shock by an area extending from the sidewall portion to the bead portion. In case of the carcass radial profile according to the invention, the tension of the carcass ply is low at the area extending from the upper region of the sidewall portion to the buttress portion and the apparent rigidity is small, which exhibit the improvement of shock-absorbing property.

With respect to the damping property on the shock vibration, the function of the damped vibration is expressed by the following equation:

$$F(t) = Be^{-\gamma t} \sin [2\pi(t-t_0)/T] \qquad (5)$$

in which F(t) is an impact force, B is an amplitude of vibration, $\gamma$ is a damping coefficient, and T is a period of vibration. The time required for damping the amplitude of vibration B to B/e is defined as the damping time by the following equation:

$$t = 1/\gamma \qquad (6)$$

In this connection, the comparison was made between the carcass radial profile according to the invention and the carcass radial profile based on the natural equilibrium form. In case of the carcass radial profile according to the invention, the tension of the carcass ply is low at the area extending between the upper region of the sidewall portion to the buttress portion and also the apparent rigidity is low, so that the damping time becomes longer, that is, the shock vibration is difficult to be damped. Therefore, if the damping property can be improved under the use of the carcass radial profile according to the invention, the conflicting relation that the improvement of the rolling resistance leads to the deterioration of other tire performances as previously mentioned can be resolved.

Figure 3:
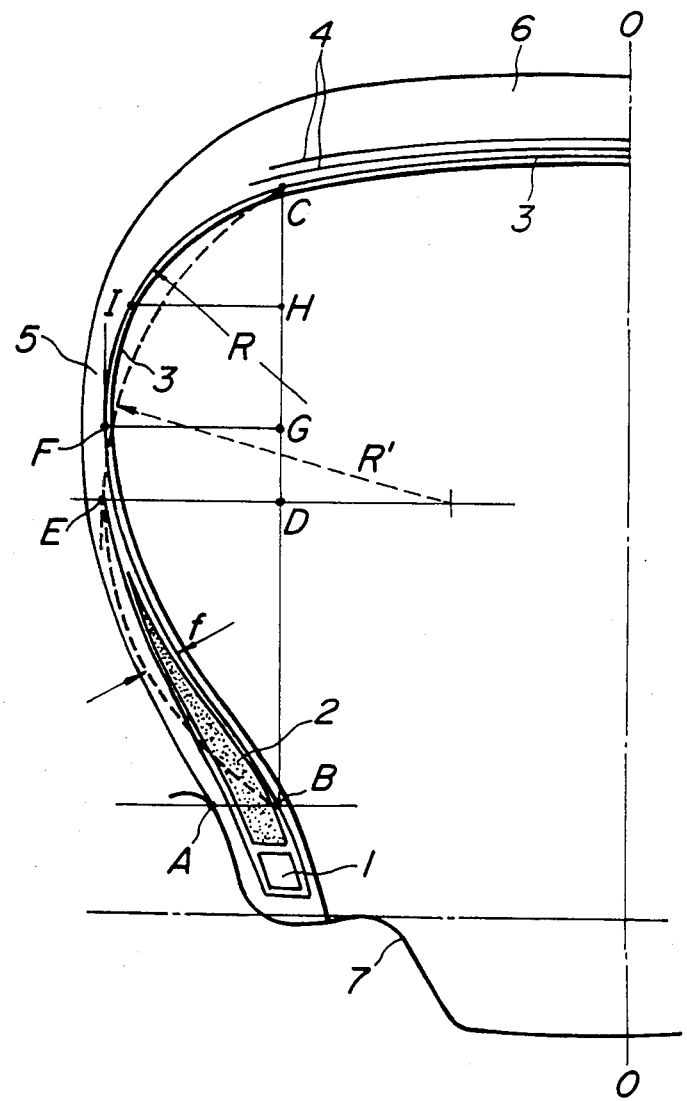
FIG. 3 is a sectional view of an embodiment of the pneumatic radial tire according to the invention.

As shown in FIG. 3, the pneumatic radial tire according to the invention comprises a reinforcement for tire body consisting of a carcass 3 composed of at least one rubberized cord ply containing organic fiber cords arranged in the substantially radial plane of the tire, which ply being wound around each bead core 1 from the inside to the outside so as to interpose a rubber filler 2 therebetween and more preferably extended further outwardly in the radial direction, and a belt 4 superimposed around the crown portion of the carcass 3 and composed of at least two rubberized ply layers each containing cords with a high modulus of elasticity arranged at a relatively small angle with respect to the mid-circumferential line of the tire, the cords of which being crossed with each another, and further comprises a rubber member for a sidewall portion 5 on the each side of the carcass 3 and a rubber member for a tread portion 6 on the outer circumference of the belt 4. In the mounted state of this tire on a normal rim 7 under a normal internal pressure, the carcass has such a radial profile in tire section that a ratio of R/R' is within a range of 0.65-0.85 and a value of f is within a range of 5-10 mm in which R is a radius of a circle passing points F, I and C, R' is a radius of a circle passing points B, E and C, and f is a maximum distance between a part FB of the carcass 3 and an arc $\stackrel{\frown}{BE}$ viewed from the normal direction of this arc, provided that a point A is an alienating point of the outer surface of the tire from the rim flange, a point B an intersection between the carcass 3 and a straight line extending from the point A toward the inside of the tire in parallel with the rotational axis of the tire, a point C an intersection between the carcass 3 and a perpendicular line drawn from the point B in the radial direction of the tire, a point D a midpoint of the line segment, $\overline{BC}$, a point E an intersection between a straight line passing through the midpoint D in parallel with the rotational axis of the tire and a straight line passing through a point F located at the maximum width of the carcass and drawn perpendicular to the rotational axis of the tire, a point G an intersection between a straight line drawn from the point F toward the inside of the tire in parallel with the rotational axis thereof and the line segment $\overline{BC}$, a point H a midpoint of the line segment $\overline{GC}$, and a point I an intersection between the carcass 3 and a straight line passing through the point H in parallel with the rotational axis of the tire.

The above explanation is made only on the left half portion of the tire shown in FIG. 3, and the right half portion is omitted from the drawing because the tire is designed symmetrically in the right and the left with respect to the equatorial plane O-O of the tire.

According to the invention, the polyester fiber cords having the aforementioned properties are used for the carcass 3, and the belt 4 is composed of plural ply layers containing unextensible cords, such as metal cords represented by steel cords, organic fiber cords made from rayon, polyester, aromatic polyamide fiber or the like, glass fiber cords and the like, inclined at a shallow angle of 10°–25° C. with respect to the equatorial plane of the tire, the cords of which being crossed with each other.

As to the arrangement of the belt 4, there may be took any known methods. For instance, the ply layers for the belt 4 are superimposed one upon another around the crown portion at both free edges; or at least one layer containing heat-shrinkable cords such as nylon cords arranged in parallel to the equatorial plane of the tire is disposed on the outer circumference of the belt 4 as an auxiliary ply for covering at least the edges of the belt ply layer; or at least one ply layer of the belt is folded at both edges toward the inner side or the outer side of the other ply layers.

In the tire according to the invention, the carcass radial profile intentionally deviates from the natural equilibrium form as mentioned above is maintained when the tire is inflated under a normal internal pressure, whereby it is intended to improve the damping property against shock vibration. The rubber filler 2 may be made of a single rubber stock as shown in FIG. 3, but may be made of two or more rubber stocks. In the later case, it is more preferable that a rubber stock having the largest volume among these rubber stocks is imparted with high hardness and hysteresis characteristics.

The effect of the invention having the aforementioned construction will be described with respect to the following examples.

Ten tires to be tested (Tire No. 1 Control; Tire Nos. 2–3 Invention; Tire Nos. 4–10 Comparative Examples) were prepared based upon the specifications shown in the following Table 1. In these tires, the carcass 3 was composed of a single cord ply containing polyester fiber cords of 1,500 D/2 arranged at 90° with respect to the equatorial plane of the tire, and the belt 4 was composed of two ply layers each containing steel cords (twisting construction: 1×5×0.25 mm) arranged at 17° with respect to the equatorial plane of the tire, the cords of the two ply layers were crossed with each other. The comparison results using the above test tires are also shown in Table 1 as an index on the basis that the control tire of Tire No. 1 is 100 with respect to the tire performances including the rolling resistance.

Moreover, the rolling resistance was evaluated as follows: that is, the test tire was rotated on a steel drum with a diameter of 1,707 mm by the driving of a motor up to a speed of 50 km/hr or 100 km/hr and then the driving of the motor was stopped to run the drum by inertia, during which the rolling resistance was calculated from the degree of deceleration speed of the drum.

TABLE 1

| | Tire No. | | | | | | | | | |
|---|---|---|---|---|---|---|---|---|---|---|
| | 1 | 2 | 3 | 4 | 5 | 6 | 7 | 8 | 9 | 10 |
| Polyester fiber | | | | | | | | | | |
| Spinning method | usual spinning | high speed spinning | high speed spinning | high speed spinning | high speed spinning | high speed spinning | high speed spinning | high speed spinning | high speed spinning | high speed spinning |
| Intrinsic viscosity | 0.90 | 1.00 | 1.00 | 1.00 | 0.70* | 1.15* | 1.00 | 1.00 | 1.00 | 1.00 |
| Specific gravity | 1.385 | 1.383 | 1.383 | 1.383 | 1.390 | 1.383 | 1.383 | 1.383 | 1.383 | 1.383 |
| Birefringence $(\Delta N) \times 10^{-3}$ | 215* | 180 | 180 | 180 | 195 | 190 | 180 | 180 | 180 | 180 |
| Number of terminal carboxyl groups | 30 | 20 | 20 | 20 | 20 | 20 | 20 | 20 | 20 | 20 |
| Twisting construction | | | | | | | | | | |
| Denier | 1500 D/2 | 1500 D/2 | 1500 D/2 | 1500 D/2 | 1500 D/2 | 1500 D/2 | 1500 D/2 | 1500 D/2 | 1500 D/2 | 1500 D/2 |
| Cable twist (r/10cm) | 40 | 40 | 40 | 40 | 40 | 40 | 40 | 40 | 30 | 55 |
| Ply twist (r/10cm) | 40 | 40 | 40 | 40 | 40 | 40 | 40 | 40 | 30 | 55 |
| NT | 0.49 | 0.49 | 0.49 | 0.49 | 0.49 | 0.49 | 0.49 | 0.49 | 0.37* | 0.68* |
| Dipped cords | | | | | | | | | | |
| Conditions | | | | | | | | | | |
| Temperature(°C.) | 245 | 245 | 245 | 245 | 245 | 245 | 245 | 245 | 245 | 245 |
| Tension (g/D) | 0.20 | 0.20 | 0.15 | 0.45 | 0.15 | 0.25 | 0.20 | 0.20 | 0.20 | 0.20 |
| Physical properties | | | | | | | | | | |
| Strength (kg/cord) | 22.0 | 21.5 | 21.5 | 21.5 | 18.0 | 23.0 | 21.5 | 21.5 | 22.0 | 21.5 |
| $\Delta E$ (%) | 5.5 | 5.5 | 7.0 | 3.5* | 5.5 | 5.5 | 5.5 | 5.5 | 5.5 | 5.5 |
| $\Delta S$ (%) | 4.3 | 2.0 | 1.5 | 4.3 | 1.5 | 3.5 | 2.0 | 2.0 | 1.0 | 3.5 |

TABLE 1-continued

|  | Tire No. | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| $\Delta S + 0.4 \Delta E$ (%) | 6.5* | 4.2 | 4.3 | 5.7* | 3.7 | 5.7* | 4.2 | 4.2 | 3.2 | 5.7* |
| Flexural fatigue resistance (minutes) | 400 | 1200 | 1200 | 1200 | 50 | 1200 | 1200 | 1200 | 50 | 1200 |
| Heat deterioration resistance (%) | 45 | 55 | 55 | 55 | 30 | 55 | 55 | 55 | 50 | 55 |
| Profile |  |  |  |  |  |  |  |  |  |  |
| R/R' | 0.50* | 0.75 | 0.80 | 0.55* | 0.80 | 0.55* | 0.50* | 0.90* | 0.80 | 0.55* |
| f | 4.5* | 7.0 | 8.0 | 6.0 | 8.0 | 5.0 | 6.0 | 7.0 | 8.0 | 5.0 |
| Tire performance |  |  |  |  |  |  |  |  |  |  |
| Rolling resistance (50 km/hr) | 100 | 115 | 116 | 100 | 116 | 102 | 100 | 102 | 116 | 102 |
| Rolling resistance (100 km/hr) | 100 | 115 | 116 | 100 | 116 | 102 | 100 | 102 | 116 | 102 |
| Lateral spring constant (Index) | 100 | 104 | 105 | 103 | 105 | 102 | 103 | 105 | 105 | 102 |
| $C_p$ (Index) | 100 | 105 | 105 | 104 | 105 | 101 | 103 | 105 | 105 | 101 |
| $E_p$ (40 km/hr) | 100 | 100 | 105 | 85 | 105 | 100 | 100 | 95 | 105 | 100 |
| Durability | 100 | 100 | 100 | 100 | 60 | 100 | 100 | 100 | 50 | 100 |

Note:
Tire size 165SR13.
Normal rim 4½J-13.
Normal internal pressure 1.7 kg/cm²

As mentioned above, the rolling resistance can largely be improved in a well balanced manner together with the cornering stability, the riding comfort against vibration and the wet skid resistance by combining rationalization of the carcass radial profile with the material and properties of the cords for the carcass ply.

What is claimed is:

1. In a pneumatic radial tire comprising a toroidal tire body extending from bead portions to a crown portion through sidewall portions, and a reinforcement for the tire body consisting of a carcass composed of at least one cord ply containing polyester fiber cords therein, which cord ply being wound around a bead core embedded in each of the bead portions from the inside of the tire to the outside thereof, and a belt composed of at least two ply layers superimposed around the crown portion of the carcass and containing cords arranged at a relatively small inclination angle with respect to the mid-circumferential plane of the tire, the cords of which being crossed with each other, the improvement wherein:

a carcass line of said tire body at a mounted state of the tire on a normal rim under a normal internal pressure depicts such a radial profile in tire section that a ratio of R/R' is within a range of 0.65-0.85 in which R' is a radius of a reference arc which passes an intersection B between the carcass line and a straight line passing through an alienating point of the outer surface of the bead portion from a flange of the rim and being in parallel with the rotational axis of the tire, an intersection C between the carcass line and a line segment being perpendicular to the above straight line and extending from the intersection B, and a point located from the line segment $\overline{BC}$ at an interval equal to a distance extending from the line segment $\overline{BC}$ to the maximum width of the carcass line when the line segment $\overline{BC}$ is taken as a chord, and R is a radius of curvature of a contour curve in a shoulder portion of the carcass line extending to the intersection C, and that a maximum distance f between the reference arc and a contour curve in a base portion of the carcass line smoothly connecting to the above contour curve and having a single inflection point toward the intersection B is within a range of 5-10 mm; and said polyester fiber cord has an elongation $\Delta E$ under a tension of 2 g/d of not less than 5%, and a value of $\Delta S + 0.4\Delta E$ of not more than 5.0% in which $\Delta S$ is a heat shrinkage of the cords as measured at 177° C. for 30 minutes.

2. A pneumatic radial tire according to claim 1, wherein said polyester fiber cord is composed of a bundle of plural fibers having a twist constant NT of 0.4-0.6 defined by the following equation (1):

$$NT = N \times \sqrt{0.139 \times D/2\rho} \times 10^{-3} \tag{1}$$

in which N is a twisting number per 10 cm of cord length, D is a total denier of cord and $\rho$ is a specific gravity of the fiber.

3. A pneumatic radial tire according to claim 1, wherein said polyester fiber cord has such micro properties as a fiber that an intrinsic viscosity is 0.75-1.10, a specific gravity is 1.356-1.390, a birefringence $\Delta N$ is $155 \times 10^{-3} \sim 195 \times 10^{-3}$, and number of terminal carboxyl groups is not more than 20 equivalents/ton.

* * * * *